Patented Aug. 10, 1937

2,089,227

UNITED STATES PATENT OFFICE 2,089,227

QUININE COMPOUNDS OF NUCLEO PROTEINS AND PROCESS FOR THEIR PRODUCTION

Simon L. Ruskin, New York, N. Y., assignor to Frances R. Ruskin, New York, N. Y.

No Drawing. Application January 26, 1933, Serial No. 653,556

6 Claims. (Cl. 260—26)

This invention relates to organic compounds, and more particularly to organic compounds of nucleoproteins and their derivatives, especially for use in the treatment of diseases, and it is my object to combine a nucleoprotein, or its derivatives, such as the nucleins, nucleotides or nucleosides, with an organic compound capable of combining with said nucleoprotein or its derivatives, thereby producing a new, valuable product. The invention further includes a method by which the combination of said organic compounds with a nucleoprotein or its derivatives may be effected.

One object of the invention consists in combining an organic compound of known therapeutical value with a protein-like substance of high molecular weight, such as a nucleoprotein or its organic hydrolytic decomposition products, thereby producing a compound which is more readily absorbed by the living tissue and is brought into closer association with it than the original pharmaceutical compound.

Another object is the combination of quinine and a nucleotide whereby the therapeutic action of the quinine is enhanced in its solubility as well as in its absorption by the living tissue.

A further object consists in combining a barbituric acid derivative, such as e. g., diethyl-barbituric acid, with a nucleotide, thereby producing a compound which is less toxic and more readily absorbed than the original barbituric acid derivative.

Other objects consist in combining other pharmaceutical compounds, such as alkaloids, e. g., of the morphine group, yohimbin, aconitin, hydrastin, digitalin and others, salicylic acid and its derivatives, cocain and other local anesthetica, salvarsan and other arsenic preparations, hormones, vitamins, antitoxins, pyrazolone derivatives, such as pyramidon, atophan and other quinoline derivatives, disinfectants, such as phenols and the like, with nucleotides, thereby producing compounds the therapeutic value of which is remarkably improved, for, on account of their greater solubility, they are much more easily absorbed by the living tissue.

Thus, the main object of this invention, representing a new conception in chemistry as well as a marked advance in therapeutica, consists in combining any organic pharmaceutical compound with a nucleoprotein or its derivatives. The invention comprises any organic compounds capable of combining with nucleoproteins or their derivatives, regardless of their chemical constitution. Thereby, the question remains open whether these compounds form true chemical reaction products, whether they are merely addition products or form colloidal solutions, or whether they represent only physical mixtures, which develop their advantageous properties only after dissolving in a suitable solvent.

Under the expression "nucleoproteins" I understand proteins composed of an albuminous component of varying nature and a second characteristic component which consists of a polynucleotide, the so-called "nucleic acids". They are present in all cell nuclei and are obtained from animal substances as well as vegetable products, such as, e. g., blood corpuscles, yeast and others. They are weak acids and are readily decomposed by the action of dilute weak acids, or on treating with water alone, or by the action of pepsine-hydrochloric acid, whereby their albumen content is reduced or the albumen component is partly decomposed, yielding the so-called "nucleins".

The nucleins as well as the nucleoproteins are split up, e. g., by the action of acids, alkalies or ferments into "nucleotides", the so-called "nucleic acids" and albumen. These nucleotides are composed of "nucleosides" and phosphoric acid and have been isolated in the form of mono-, di- and poly-nucleotides; i. e., containing one, two or more nucleotide complexes; the di- and poly-nucleotides are probably formed by combination of the mononucleotides with each other by means of the phosphoric acid residue. The nucleotides are acids, and are decomposed by the action of hot water, ferments, acids or alkalies. Some mononucleotides were isolated from pancreas and from extract of meat, while polynucleotides containing four nucleotides were obtained from vegetable matter (yeast) or animal tissues (thymus, leucocytes, etc.).

The "nucleosides" which, in combination with phosphoric acid, form the nucleotides, are glucosides of various purine and pyrimidine bases, i. e., compounds composed of carbohydrates and these bases. They are obtained by the action of ferments and are finally decomposed into the various "purine" and "pyrimidine" bases, of which the following may be mentioned: Thymin, cytosin, uracil, adenin and guanin. These final hydrolytic decomposition products, of course, have also been produced directly from nucleoproteins, nucleins and nucleotides by the action of acids or alkalies.

For the purpose of disclosing this invention I will describe how the quinine compound of a mononucleotide, of adenylic acid, may be produced. It is conceivable that other compounds than quinine, capable of combining with nucleoproteins or their derivatives, may be used as well as other methods of combining said pharmaceutical compounds and nucleoproteins or their derivatives than the described one may be employed.

*Example*

Adenylic acid, obtained e. g. by hydrolyzing nucleic acid from yeast, is dissolved in water. To this solution an equivalent amount of quinine monohydrochloride, dissolved in water, is added. Then an amount of a concentrated sodium hydroxide solution equivalent to the content of the quinine salt on hydrochloric acid is added. The precipitate obtained is filtered, washed with as little water as possible and dried at a low temperature.

By evaporating the mother liquor another portion of the product is obtained which may be purified by dissolving in alcohol, filtering from the undissolved sodium chloride and evaporating the alcohol.

The obtained product is yellowish white, soluble in water and also in physiological salt solution and represents a combination of quinine and adenylic acid of valuable therapeutical properties.

Other combinations of nucleotides and organic pharmaceutical compounds may be obtained in a similar manner or in any other desired manner.

Thus, the invention is not limited to the specific example given, as modifications may be made by those skilled in the art in accordance with the principles herein set forth.

What I claim is:

1. The reaction product of isolated adenylic acid and quinine.

2. The method of producing therapeutically valuable preparations which comprises treating a solution of isolated adenylic acid with quinine monohydrochloride, adding a basic material to the mixture, and separating the resulting precipitate.

3. As a therapeutic agent, a compound of quinine and of an isolated nucleotide.

4. The method of producing therapeutically valuable preparations which comprises treating an isolated nucleotide with quinine.

5. As a therapeutic agent, a compound of a member of the group consisting of isolated mono- and dinucleotides and quinine.

6. As a therapeutic agent, a compound of a member of the group consisting of isolated mono- and dinucleotides and their decomposition products which contain a pyrimidine ring, and quinine.

SIMON L. RUSKIN.